Feb. 24, 1970 D. DE GIORGI ET AL 3,497,105
METERING APPARATUS FOR DELIVERING MEASURED
QUANTITIES OF A COMPRESSED FLUID
Filed April 8, 1968 2 Sheets-Sheet 1

Dino De Giorgi
Stefano Canova
INVENTORS

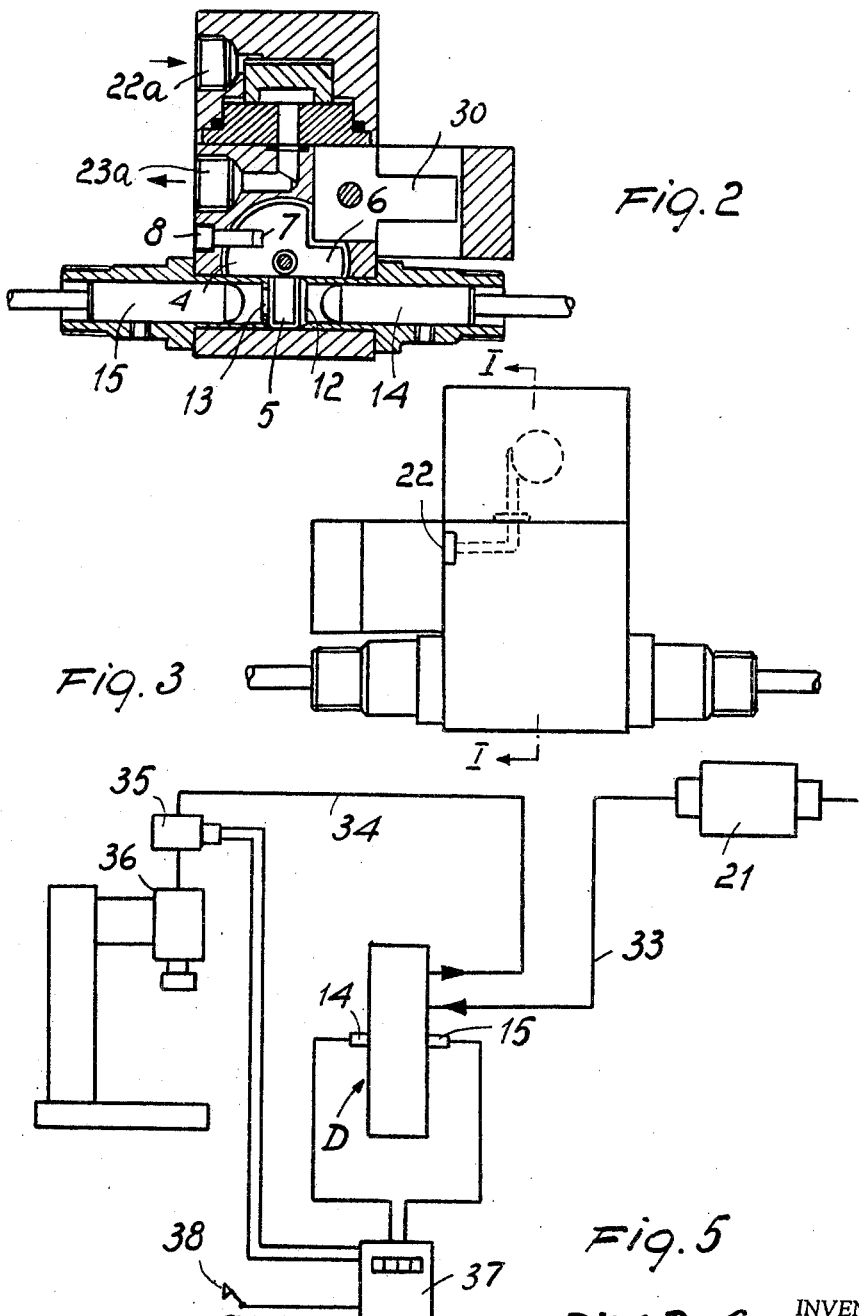

United States Patent Office 3,497,105
Patented Feb. 24, 1970

3,497,105
METERING APPARATUS FOR DELIVERING MEASURED QUANTITIES OF A COMPRESSED FLUID
Dino De Giorgi, Via Pietro Maffi 5, and Stefano Canova, Via Privata Albertini, both of Pavia, Italy
Filed Apr. 8, 1968, Ser. No. 719,388
Claims priority, application Italy, Apr. 11, 1967, 14,821/67
Int. Cl. G01f 11/12
U.S. Cl. 222—20                                           4 Claims

ABSTRACT OF THE DISCLOSURE

This disclosure relates to a metering apparatus for filling a bottle with measured quantities of liquid, comprising a cylinder with a piston movable therein and displacing pre-established quantities of the liquid into said bottle and pulse generating means cooperating with the movement of the piston and emitting a number of pulses proportional to the quantity of liquid displaced by the piston and a counter counting the number of pulses and adapted to actuate a control valve for the liquid to be supplied.

BACKGROUND OF THE INVENTION

This invention relates to a metering apparatus for delivering measured quantities of a compressed fluid, such as a gas in liquid state, to bottles for filling such bottles with measured quantities of such compressed fluid. The apparatus is particularly suitable for filling aerosol bottles or spraying bottles.

SUMMARY OF THE INVENTION

The metering apparatus for delivering measured quantities of a compressed fluid comprises, according to the invention, a metering cylinder having a piston movable therein and dividing the cylinder cavity thereof into two cylinder spaces at opposite sides of said piston, distributing valve means, duct means connecting each of said cylinder spaces with said distributing valve means, a delivery head connected with said distributing valve means, a source of compressed fluid to be delivered and connected with said distributing valve, said distributing valve means alternately connecting one of said cylinder spaces with said delivery head and said source of compressed fluid and at the same time alternately connecting the other of said cylinder spaces with said source of compressed fluid and said delivery head, thereby causing the compressed fluid to urge said piston towards the cylinder space connected with said delivery head, pulse generating means responsive to the displacement of said piston, a pulse counter adapted to count the pulses caused by the displacement of said piston and to generate a controlling signal when a predetermined number of pulses has been counted, electrically controlled valve means between said delivery head and said distributing valve and responsive to said controlling signal emitted by said pulse counter.

BRIEF DESCRIPTION OF THE DRAWING

The invention will be more fully described with reference to a preferred embodiment thereof, shown by way of example in the accompanying drawing in which:

FIG. 2 shows a section according to line II—II of FIG. 1;

FIG. 3 shows a lateral view of the apparatus in the direction of arrow A of FIG. 1;

FIG. 5 shows a block diagram of additional component parts of the apparatus.

DESCRIPTION OF THE PREFERRED EMBODIMENT

Figure 1:
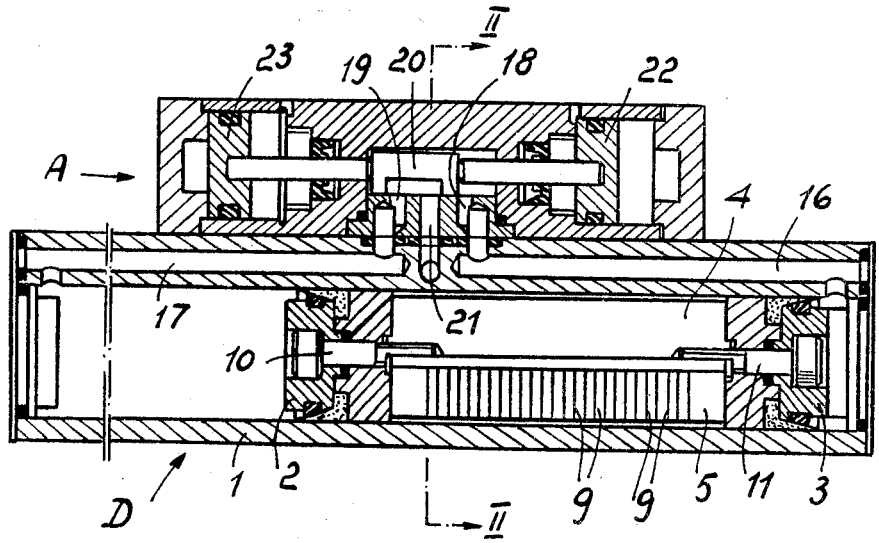
FIG. 1 shows a section of the apparatus according to line I—I of FIG. 3.

The embodiment shown, comprises a metering cylinder D having a body 1 with a cylindrical cavity closed at both ends thereof, in which two piston heads 2, 3 are slidable. The piston heads are provided with sealing means providing a sealing contact between the cylinder wall and the piston. The piston heads are connected by means of a rod having the shape of a sector of a cylinder 4. This cylinder sector is connected to the piston heads by means of screws 10 and 11 respectively and has longitudinal ribs 5 and 6 perpendicular to each other. The cylindrical sector 4 is further provided with a longitudinal groove 7 in slidable engagement with a guideway 8 fixed on the body 1.

The rib 5 is provided with a plurality of equidistant slits or zones 9, which, during the motion of the piston heads, are arranged to pass past two openings 12–13 provided in the body 1 on both sides of the rib 5. Facing these openings are sensitive means or a source of light 14 and a photoelectric cell (photoconductive diode) 15 respectively, which are parts of a pulse generating circuit described hereinafter.

The ends of the two cylinder spaces in which the cylinder cavity of the body 1 is divided by the piston heads, communicate through ducts 16–17, with the ports 18, 19 of a distributing valve 20, which is hydraulically connected with a pump 21 for the compressed liquid which has to be delivered in metered quantities through the union 22a and with the delivering head through the outlet union 23a.

Figure 4:
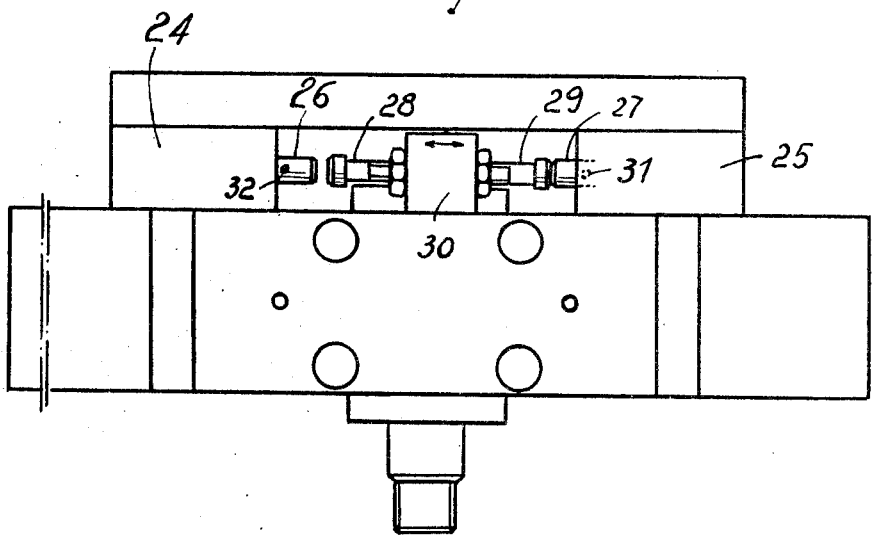
FIG. 4 shows a plan view of the apparatus.

The distributing valve 20 is shifted to-and-fro by means of the rods of small pistons 22 and 23, actuated by a source of compressed air the supply of which is controlled by two pneumatic valves 24 and 25 (FIG. 4) the movable stems 26 and 27 whereof are actuated by adjustable pushers 28 and 29, carried by a striker member 30, which is actuated when the piston heads 2 and 3 reach their stroke ends.

In fact, as visible in FIG. 2, the striker member 30 is partially received in a recess of the cylinder sector 4 defined by rib 6 thereof and the remaining portions of the cylinder sector. At the longitudinal ends of this recess in the cylinder sector stop surfaces (non visible in the drawing) are provided, which strike against the striker member 30 whenever the piston heads 2 and 3 reach their stroke ends.

The pneumatic valves 24 and 25 are provided with vent openings 31 and 32.

Inserted in the circuit of the pulse generating means 14 and 15 is an electronic counter 37 of adjustable kind, which may be of any known type, such as the one manufactured by the Suisse firm "Elesta." The counter 37 is adapted to actuate an electrically controlled valve 35, which is adapted to open or close the passage of compressed fluid towards the delivering head 36, provided with a nozzle which may be connected to a bottle to be filled with the compressed fluid.

The operation of the apparatus is as follows.

In the position shown in FIG. 1 the compressed fluid passes from pump 21 through pipe 33 ducts 18 and 16 into the cylinder space delimited by the piston head 3. At the same time the cylinder space delimited by the piston head 2 communicates through ducts 17 and 19, pipe 34 and open valve 35 with the delivering head 36. The pressure build-up in the cylinder space of piston head 3 urges the piston 2–3 towards the left thereby causing the flow of compressed fluid through the delivery head.

When the piston head 2 reaches the end of its stroke, the striker member 30 is actuated by the corresponding shoulder of the connecting member 4 thereby pressing with its pusher 28 the movable rod 26 of the pneumatic valve 24 which opens the passage of compressed air towards the small piston 23, which is of single acting type, thereby displacing such piston and consequently the distributing valve 20 towards the right, since at the same time the vent opening 31 of the pneumatic valve 25 is opened as soon as the pusher 29 disengages from the rod 27 of the pneumatic valve 25. In this way the hydraulic communication of the cylinder spaces of the piston heads 2 and 3 are reversed so that the compressed fluid now enters the cylinder space of piston head 2 and urges the piston 2–3 towards the right repeating the previously described operating stages.

During the movement of the piston 2–3 the zones or apertures 9 pass successively in the reach or in front of the sensitive means or source of light 14 allowing successively passage of light towards the photoelectric cell 15 so that a number of pulses are generated, corresponding to apertures or zones 9 passed in front or in the reach of the sensitive means or of the source of light 14. The counter 37 counts the number of pulses and when a pre-established number of pulses is attained the counter 37 emits an electric signal which actuates the electrically controlled valve 35 so that the delivery of the liquid is shut off. At the same time the counter 37 is zeroed and through another circuit, not shown in the drawing, the pump 21 is stopped by the counter 37.

The switch 38 is destined to start the apparatus after it has been stopped by the counter 37.

The distance between the slits or apertures 9 is so chosen that the corresponding volume of the cylinder cavity corresponds to 1 ml. of the delivered liquid and consequently each pulse indicates the delivery of 1 ml. of the liquid.

We claim:

1. A metering apparatus for delivering measured quantities of a compressed fluid, comprising a metering cylinder having a piston movable therein and dividing the cylinder cavity thereof into two cylinder spaces at opposite sides of said piston, distributing valve means, duct means connecting each of said cylinder spaces with said distributing valve means, a delivery head connected with said distributing valve means, a source of compressed fluid to be delivered and connected with said distributing valve means, said distributing valve means alternately connecting one of said cylinder spaces with said delivery head and said source of compressed fluid and at the same time alternately connecting the other of said cylinder spaces with said source of compressed fluid and said delivery head, thereby causing the compressed fluid to urge said piston towards the cylinder space connected with said delivery head, wherein, according to the improvement, said piston within said cylinder cavity has a piston head on each of its longitudinal ends and a connecting member between said piston heads and mechanically connecting said piston heads, and wherein the apparatus further comprises pulse generating means responsive to the displacement of said piston and including a plurality of spaced equidistant zones distributed over the length of said connecting member and sensitive means at least on one side of said zones and responsive to the passage of said zones within the reach of said sensitive means to generate a pulse at each of such passages, a pulse counter adapted to count the pulses caused by the displacement of said piston and to generate a controlling signal when a predetermined number of pulses has been counted, electrically controlled valve means between said delivery head and said distributing valve and responsive to said controlling signal emitted by said pulse counter.

2. A metering device according to claim 1, wherein the distance between said zones defines with the cross-sectional area of said cylinder cavity a volume unit.

3. A metering apparatus for delivering measured quantities of a compressed fluid, comprising a metering cylinder having a piston movable therein and dividing the cylinder cavity thereof into two cylinder spaces at opposite sides of said piston, distributing valve means, duct means connecting each of said cylinder spaces with said distributing valve means, a delivery head connected with said distributing valve means, a source of compressed fluid to be delivered and connected with said distributing valve means, said distributing valve means alternately connecting one of said cylinder spaces with said delivery head and said source of compressed fluid and at the same time alternately connecting the other of said cylinder spaces with said source of compressed fluid and said delivery head, thereby causing the compressed fluid to urge said piston towards the cylinder space connected with said delivery head, wherein, according to the improvement, said piston within said cylinder cavity has a piston head on each of its longitudinal ends and a connecting member between said piston heads and mechanically connecting said piston heads, and wherein the apparatus further comprises pulse generating means responsive to the displacement of said piston and including a plurality of equidistant apertures distributed over the length of said connecting member and a source of light on one side of said apertures and a photoelectric cell on the other side of said apertures and which is caused to emit a pulse when a corresponding of said apertures allows the passage of light from said source of light towards said photoelectric cell, a pulse counter adapted to count the pulses caused by the displacement of said piston and to generate a controlling signal when a predetermined number of pulses has been counted, electrically controlled valve means between said delivery head and said distributing valve and responsive to said controlling signal emitted by said pulse counter.

4. A metering device according to claim 3, wherein the distance between said apertures defines with the cross-sectional area of said cylinder cavity a volume unit.

References Cited

UNITED STATES PATENTS 3,283,957  11/1966  Henderson _____ 222—249 X

STANLEY H. TOLLBERG, Primary Examiner

U.S. Cl. X.R.

222—249